United States Patent
Redmon

(10) Patent No.: US 10,479,558 B2
(45) Date of Patent: Nov. 19, 2019

(54) SHIPPING STATEMENT ENVELOPE

(71) Applicant: C. Peter Redmon, Peru, IN (US)

(72) Inventor: C. Peter Redmon, Peru, IN (US)

( * ) Notice: Subject to any disclaimer, the term of this patent is extended or adjusted under 35 U.S.C. 154(b) by 0 days.

(21) Appl. No.: 15/676,000

(22) Filed: Aug. 14, 2017

(65) Prior Publication Data
US 2019/0047750 A1 Feb. 14, 2019

(51) Int. Cl.
B65D 27/16 (2006.01)
G06Q 10/08 (2012.01)

(52) U.S. Cl.
CPC ......... *B65D 27/16* (2013.01); *G06Q 10/0832* (2013.01)

(58) Field of Classification Search
CPC ........ B65D 27/16; B65D 27/14; B65D 27/06; B65D 27/00; B65D 33/20; B65D 2101/00; B65D 33/1691; G06Q 10/0832
USPC ... 229/71, 92.3, 305, 304, 68.1, 79, 80, 212, 229/300, 303, 80.5; 206/807; 383/5, 84, 383/211
See application file for complete search history.

(56) References Cited

U.S. PATENT DOCUMENTS

| | | | | |
|---|---|---|---|---|
| 4,937,040 A * | 6/1990 | Holcomb | ............... | B65D 33/20 206/807 |
| 5,135,313 A * | 8/1992 | Bowman | ................ | B65D 33/34 229/70 |
| 5,474,229 A * | 12/1995 | Shimazaki | ............. | B65D 27/00 229/69 |
| 5,495,981 A * | 3/1996 | Warther | ................ | B42D 5/027 229/71 |
| 5,788,377 A * | 8/1998 | Vetter | .................... | B65D 27/30 383/107 |
| 5,918,983 A * | 7/1999 | Palazzolo | .............. | B65D 33/34 383/5 |
| 6,155,476 A * | 12/2000 | Fabel | ..................... | B42D 15/08 229/92.3 |
| 2002/0088847 A1* | 7/2002 | Attia | ...................... | B65D 27/00 229/68.1 |
| 2004/0000581 A1* | 1/2004 | Brandolini | .............. | B32B 27/08 229/68.1 |

* cited by examiner

Primary Examiner — Christopher R Demeree

(74) Attorney, Agent, or Firm — Wood, Phillips, Katz, Clark & Mortimer

(57) ABSTRACT

An improved shipping statement envelope in disclosed which has been sized and configured for use with automated equipment which functions to automatically fold and insert, or stuff, shipping documents into the envelope. A transparent portion on the forward surface of the envelope permits address information and the like provided on the shipping documents to readily inspected from the exterior of the envelope. A pressure-sensitive adhesive provided on a rear surface of the envelope can be exposed to permit the envelope to be closed, and permits the envelope and its contents to be easily secured to an associated package.

12 Claims, 3 Drawing Sheets

SHIPPING STATEMENT ENVELOPE

CROSS-REFERENCE TO RELATED APPLICATIONS

Not Applicable.

FEDERALLY SPONSORED RESEARCH OR DEVELOPMENT

Not Applicable,

MICROFICHE/COPYRIGHT REFERENCE

Not Applicable.

FIELD OF THE INVENTION

The present invention relates generally to envelopes that can be affixed to packages for enclosing shipping or packing documents, and more particularly to a shipping statement envelope that can be efficiently used for attaching shipping statements, packing slips, and like documentation to the exterior of an associated package by the provision of pressure-sensitive adhesive provided on the body of the envelope, with the envelope being dimensioned and configured to receive tri-folded documents inserted therein with the use of automated folding and stuffing machinery.

BACKGROUND OF THE INVENTION

In connection with the usual shipment of various articles through postal and related delivery services, it is common to provide shipping statements, packing slips, product order information, delivery information, and like documentation in envelopes configured for securement to the exterior of an associated shipping carton or other container.

The widespread popularity of the Internet-based sale of goods has resulted in millions of individual packages being sent each day to homes in America. Companies such as Amazon, Wayfair, Houzz, Hayneedle, etc., typically require that a packing list for a shipment not only be provided on the outside of the shipping carton, but additionally require that the company name is visible as well.

Heretofore, this has typically required custom, hand-folding of literally thousands of 8.5 by 11 inch packing lists on a regular basis, followed by hand-loading of the packing lists into currently available packing list envelopes. These envelopes, as typified by a Uline S-207 envelope, have a pouch-like configuration, including a transparent front panel, such as acetate, secured by heat-sealing at all margins thereof to a rear panel having pressure-sensitive adhesive, covered by a release layer.

A slit is provided in the rear panel which requires manual end-loading of a packing slip by manipulation of the packing slip through the slit in the rear panel, before the release layer is removed to expose the adhesive. This typical arrangement requires tri-folding and cross folds of each packing slip. The pouch-like envelopes must be sized to meet the requirements of shippers, including specific requirements regarding visibility of the business entity, shipment information, and the like, from the exterior of the envelope.

Experience has shown that many individual shippers have developed their own specific requirements regarding display of their name and shipment information, but typically the shipping statements themselves are similarly sized. While there are certain envelopes that are configured for top-loading, as opposed to side-loading, shipping statements must still be displayed in accordance with the shipper's requirements, with manual folding and insertion of the documents remaining cumbersome and time-consuming. There are top-load packing list envelopes on the market that are appropriately sized to receive tri-folded documents, with the company name being visible as required, but folding and inserting shipping statements into such envelopes is still a tedious and time-consuming task, and an improved arrangement would be desirable.

There are folding and stuffing machines currently on the market that will, for example, tri-fold an 8.5 by 11 inch sheet of paper, and merge it with a standard business envelope by automatically stuffing it inside. However, these types of machines, such as Neopost's Model DS-35, are not capable of handling the typical packing slip envelopes that are currently in widespread use.

The present invention is directed to an improved shipping statement envelope, and a method of use, which facilitates convenient and efficient securement of shipping documentation to the exterior of an associated package by permitting use of automated folding and stuffing machinery for inserting shipping documentation into the envelope.

SUMMARY OF THE INVENTION

In accordance with the present invention, and improved shipping statement envelope has been sized and configured for use with automated equipment which functions to automatically fold and insert or stuff shipping documents into the envelope. Thereafter, a pressure-sensitive adhesive provided on a rear surface of the envelope can be exposed to permit the envelope and its contents to be easily secured to an associated package. Considerable savings can be achieved through the use of such automated equipment, particularly in connection with mail order businesses and the like, which must routinely package, address, and ship thousands of packages.

As shown in the illustrated embodiment, a shipping statement envelope embodying the present invention comprises a folded envelope body including a front panel and a rear panel joined to each other at opposite side edges and a bottom edge. The envelope body is preferably formed by folding a single piece of suitable paper or like material as typically employed for envelope formation.

The envelope body defines an access opening, or opened throat, at an upper edge of the rear panel for access to an interior of the envelope body. In order to permit convenient inspection of documentation within the envelope, the front panel includes a transparent portion, typically in the form of acetate material or the like. The front panel further includes a flap portion which extends beyond the upper edge of the rear panel. The flap portion, sometime referred to as a commercial flap, can be folded into partially overlapping relationship with the rear panel for closing the access opening.

A pressure-sensitive adhesive layer is provided on the rear panel of the envelope body. The flap portion of the front panel can be adhered to adhesive layer when the flap portion is folded to close the access opening, thereby enclosing and sealing shipping documentation within the envelope.

A release layer is removably applied to the pressure-sensitive adhesive layer on the rear panel of the envelope body. After a shipping statement, packing slip, or like documentation is placed in the interior of the envelope body, the release layer can be removed to expose the pressure-sensitive adhesive layer, and the flap portion folded and adhered to the adhesive layer to close the access opening. Address information and the like provided on the shipping documentation can be readily observed through the transparent portion of the front panel of the envelope body. The adhesive layer thereafter permits the shipping statement envelope and its contents to be secured to an associated package from shipment.

Notably, in the preferred form, the present shipping statement envelope is dimensioned as a standard, No. 10, business-size envelope. By this configuration, and by virtue of the arrangement of the pressure-sensitive adhesive and release layer of the envelope, the envelope can be used with commercially available envelope stuffing machinery, such as Neopost Model DS-63. To further facilitate such automated use, it is contemplated the documentation inserted within the envelope comprise a tri-fold shipping statement, that is, one or more documents that have been horizontally folded into thirds, such as in the nature of typical business correspondence. Automated insertion machinery such as noted above can ordinarily be operated to automatically effect such tri-folding prior to insertion of each document into a respective one the envelopes.

The present invention further contemplates a method of affixing a shipping statement to an associated package. The present method comprises the steps of providing a shipping statement envelope comprising a folded envelope body including a front panel and a rear panel joined to each other at opposite side edges and a bottom edge, wherein the envelope body defines an access opening at an upper edge of the rear panel for access to an interior of the envelope body.

The front panel includes a transparent portion, and further includes a flap portion which extends beyond the upper edge of the rear panel, and which can be folded into partially overlapping relationship with the rear panel for closing the access opening. The envelope further includes a pressure-sensitive adhesive layer on the rear panel, so that the flap portion of the front panel can be folded and adhered to the adhesive layer to close the access opening. A release layer applied to the pressure-sensitive adhesive layer maintains the adhesive in a fresh condition.

The present method further includes inserting the shipping statement into the interior of said envelope body, and removing the release layer to expose the pressure-sensitive adhesive layer.

Next, the present method entails folding the flap portion to close the access opening and adhere the flap portion to the adhesive layer. The shipping statement documentation is thus enclosed and sealed within the envelope, with the transparent portion of the front panel of the envelope body permitting convenient inspection and reading of the documentation.

Finally, the shipping statement envelope and the shipping statement can be adhered and secured to an associated package by application of the exposed pressure-sensitive adhesive to the exterior of the package, and the package can thereafter be shipped. In accordance with the preferred form of the present invention, the shipping statement envelope is dimensioned for use in automated folding and stuffing machinery, thus facilitating convenient and efficient securement of shipping documentation to packages.

Other features and advantages of the present invention will become readily apparent from the following detailed description, the accompanying drawings, and the appended claims.

DETAILED DESCRIPTION OF THE PREFERRED EMBODIMENT

Figure 1:
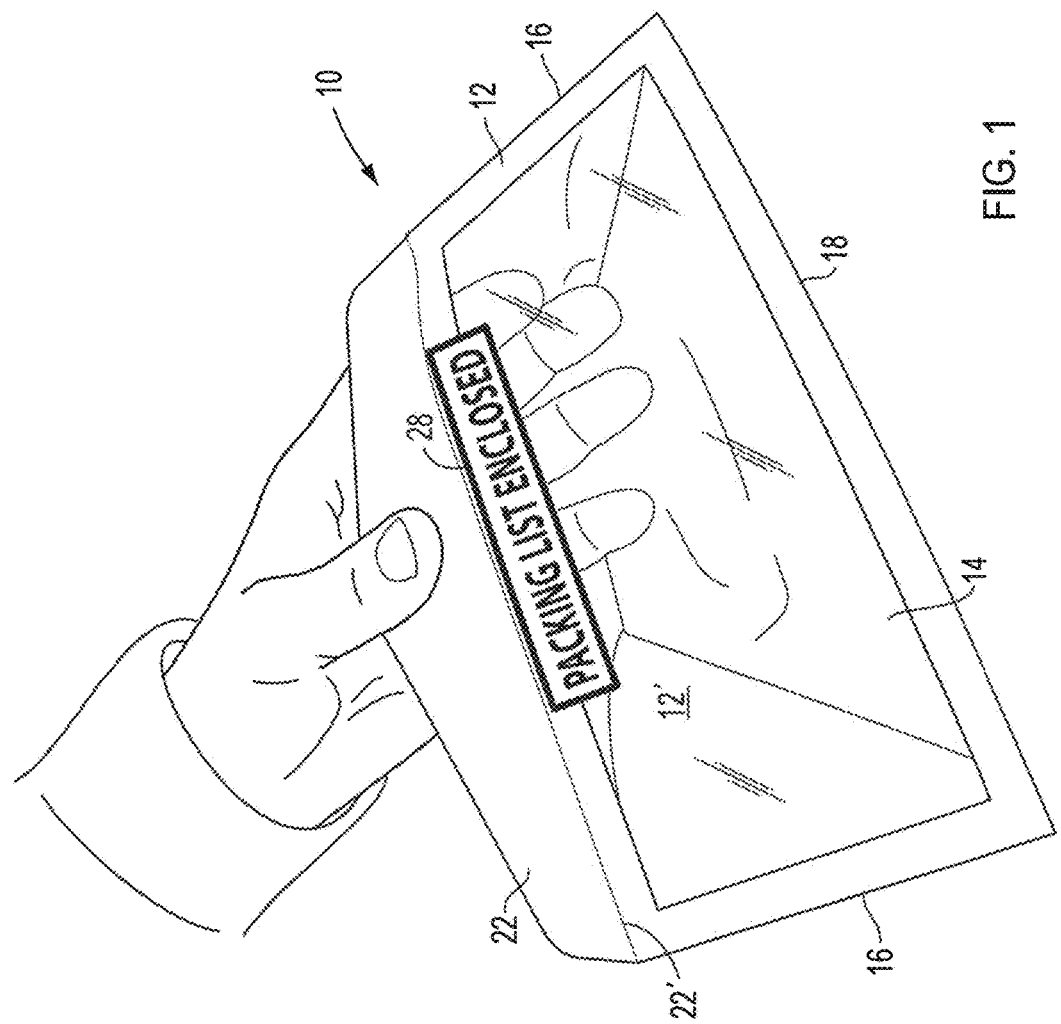
FIG. 1 is a front perspective view of a shipping statement envelope embodying the principles of the present invention.

While the present invention is susceptible of embodiment in various forms, there is shown in the drawings and will hereinafter be described as a presently preferred embodiment, with the understanding that the present disclosure is to be considered an exemplification of the invention, and is not intended to limit the invention to the specific embodiment illustrated.

The present invention is directed to an improved envelope structure which is particularly suited for receiving shipping documentation, such as packing slips and the like, with the envelope thereafter affixed to the exterior of the package to be shipped. Heretofore, envelopes of this nature have typically included a portion which is transparent on the forward surface of the envelope, thus facilitating inspection of documents within the envelope to ascertain address information and the like for the recipient of the package.

Pressure-sensitive adhesive is typically provided for securing the envelope to the package, with a removable release layer maintaining the adhesive in a fresh condition. So-called "crack and peel" of the release layer is effected to expose the pressure-sensitive adhesive, and the envelope and its contents then affixed to the associated package.

A slit or like access opening is provided, typically in the rear surface of the envelope, to permit folded shipping documentation to be inserted into interior of the envelope. Subsequent to insertion of the documentation in the envelope, the release layer can be removed from the pressure-sensitive adhesive, and the envelope and the enclosed documentation secured to the exterior of the package so the envelope is securely affixed thereto, with the documentation within the envelope being plainly visible through the transparent portion of the envelope.

Figure 2:
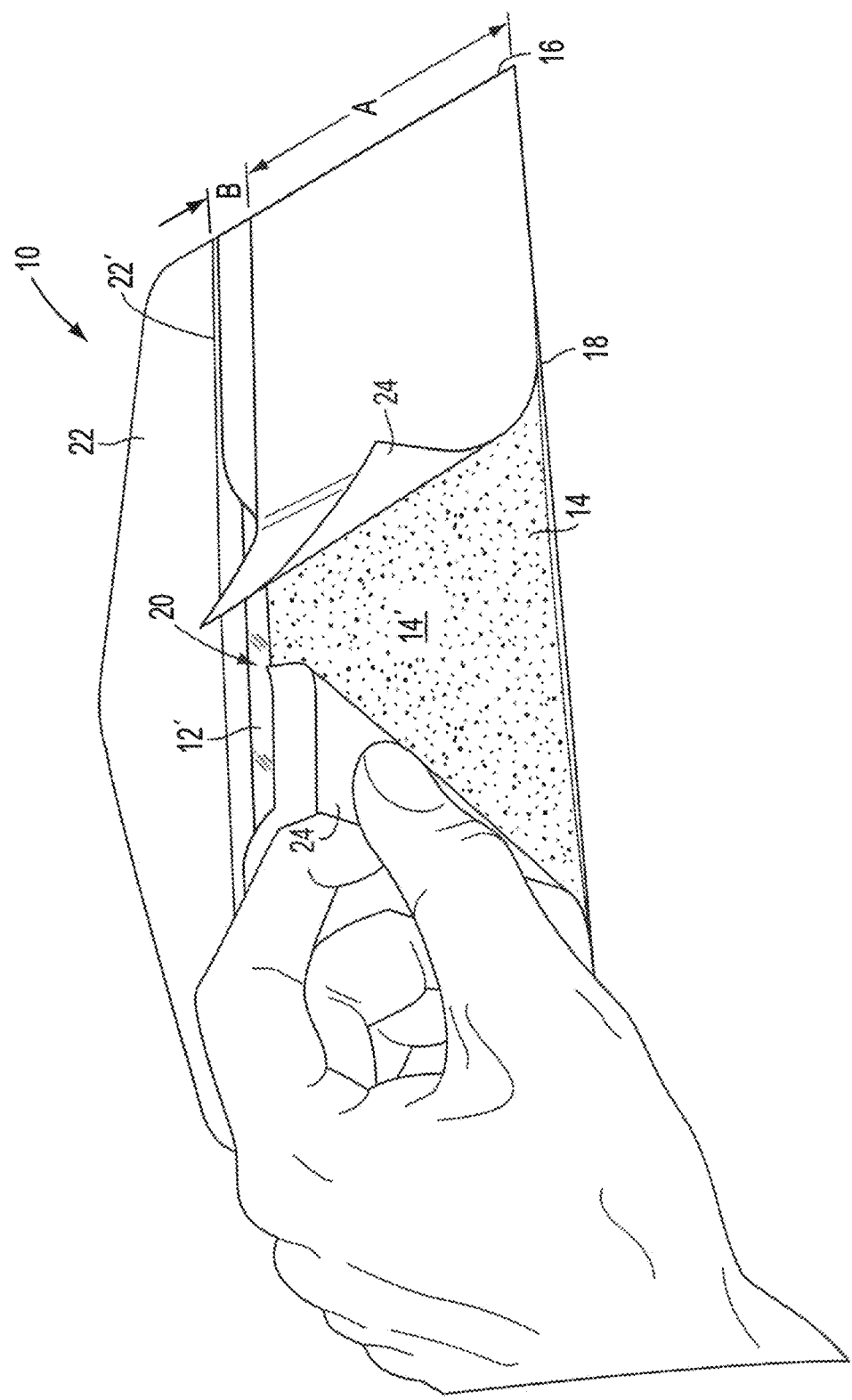
FIG. 2 is a rear perspective view of the present shipping statement envelope showing removal of a release layer to expose a pressure-sensitive adhesive.

While above described type of shipping statement envelope is in widespread use, experience has shown the such use can be cumbersome and time-consuming. Typically, such envelopes have been sized and configured to requiring folding of shipping documentation, and manual insertion of the documents through the slit or other access opening of the envelope In accordance with the present invention, and as illustrated in FIGS. 1 and 2, an improved shipping statement envelope 10 has been particularly sized and configured for use with automated equipment which functions to automatically fold and insert, or stuff, shipping documents into the envelope. As will be further described, a pressure-sensitive adhesive provided on a rear surface of the envelope can be thereafter be exposed to permit the envelope and its contents to be easily secured to an associated package. Considerable savings can be achieved through the use of such automated equipment, particularly in connection with mail order businesses and the like, which must routinely package, address, and ship thousands of packages.

By way of example, in the illustrated embodiment, the present shipping statement envelope 10 has been dimensioned in accordance with a typical "No. 10" business-size envelope, with typical dimensions of approximately 4.25 by 9.5 inches. While an envelope embodying the present invention may be otherwise dimensioned, use with automated equipment is specifically contemplated, and such equipment is ordinarily configured for use with envelopes, and documents for insertion, of pre-determined, standardized sizes. The illustrated embodiment is suited for use with automated equipment such as Neopost Model DS-63. This type of equipment can automatically fold and insert conventionally dimensioned shipping statements, such as have typical business dimensions of 8.5 by 11 inches.

As shown in the illustrated embodiment, the shipping statement envelope 10 embodying the present invention comprises a folded envelope body including a front panel 12 and a rear panel 14 joined to each other at opposite side edges 16 and a bottom edge 18. The envelope body is preferably formed by folding a single piece of suitable paper or like material as typically employed for envelope formation, but can be otherwise formed to provide the desired structure.

The envelope body defines an access opening, or opened throat, generally designated 20 (FIG. 2) at an upper edge of the rear panel for access to an interior of the envelope body. In order to permit convenient inspection of documentation within the envelope, the front panel 12 includes a transparent portion 12', typically in the form of acetate material or the like. The front panel further includes a flap portion 22 which extends beyond the upper edge of the rear panel and the access opening 20. The flap portion 22, sometimes referred to as a commercial flap, can be folded at fold line 22' into partially overlapping relationship with the rear panel 14 for closing the access opening 22. Notably, the flap portion 22 is ungummed, and is not provided with any type of adhesive or the like.

A pressure-sensitive adhesive layer 14', shown with surface shading in FIG. 2, is provided on the rear panel 14 of the envelope body. The pressure-sensitive adhesive serves the dual purposes of sealing the interior of the envelope 10 by adhering flap portion 22 to the rear panel 14, and securing and affixing the envelope 10 and its contents to an associated package, carton, or like shipping container.

To this end, the pressure-sensitive adhesive layer 14' preferably extends substantially completely transversely of the rear panel portion 14 between side edges 16, and substantially completely vertically between bottom edge 18 and the top edge of rear panel 14 at access opening 20, as indicated by dimension A in FIG. 2. It will be noted that the adhesive 14' is thus in spaced relationship, by a dimension B, from the fold line 22' for the flap portion 22. Portions of the rear panel 14 may extend, as illustrated, on respective opposite sides of access opening 20, and terminate at or below the fold line 22' for the flap portion 22. These portions of the rear panel are not provided with the adhesive 14'.

By this relative dimensioning, the flap portion 22 can be folded to at least partially overlap the adhesive layer 14'. The flap portion 22 of the front panel 14 can be adhered to adhesive layer 14' when the flap portion is folded to close the access opening 20, thereby enclosing and sealing shipping documentation within the envelope.

A release layer 24 is removably applied to the pressure-sensitive adhesive layer 14' on the rear panel 14 of the envelope body. In the illustrated embodiment, the release layer is provided in the form of one or more separate pieces which extend from the vertical centerline of the envelope to the respective, opposite side edges 16. This arrangement ensures that all regions of the pressure-sensitive adhesive layer are covered and protected to maintain the adhesive in a fresh and tacky condition. Additionally, the arrangement permits use in automated equipment, with the release layer 24 remaining in contact with the adhesive as the envelope is processed by automated equipment for insertion and positioning of a shipping statement therein. This type of arrangement of adhesive and release layer is sometime referred to as "crack and peel", since as shown in FIG. 2, the envelope 10 can be manipulated and flexed generally at its vertical centerline to "crack" and initiate removal of the pieces of the release layer 24, and the release layer pieces thereafter "peeled" off of the adhesive layer 14'.

Figure 3:
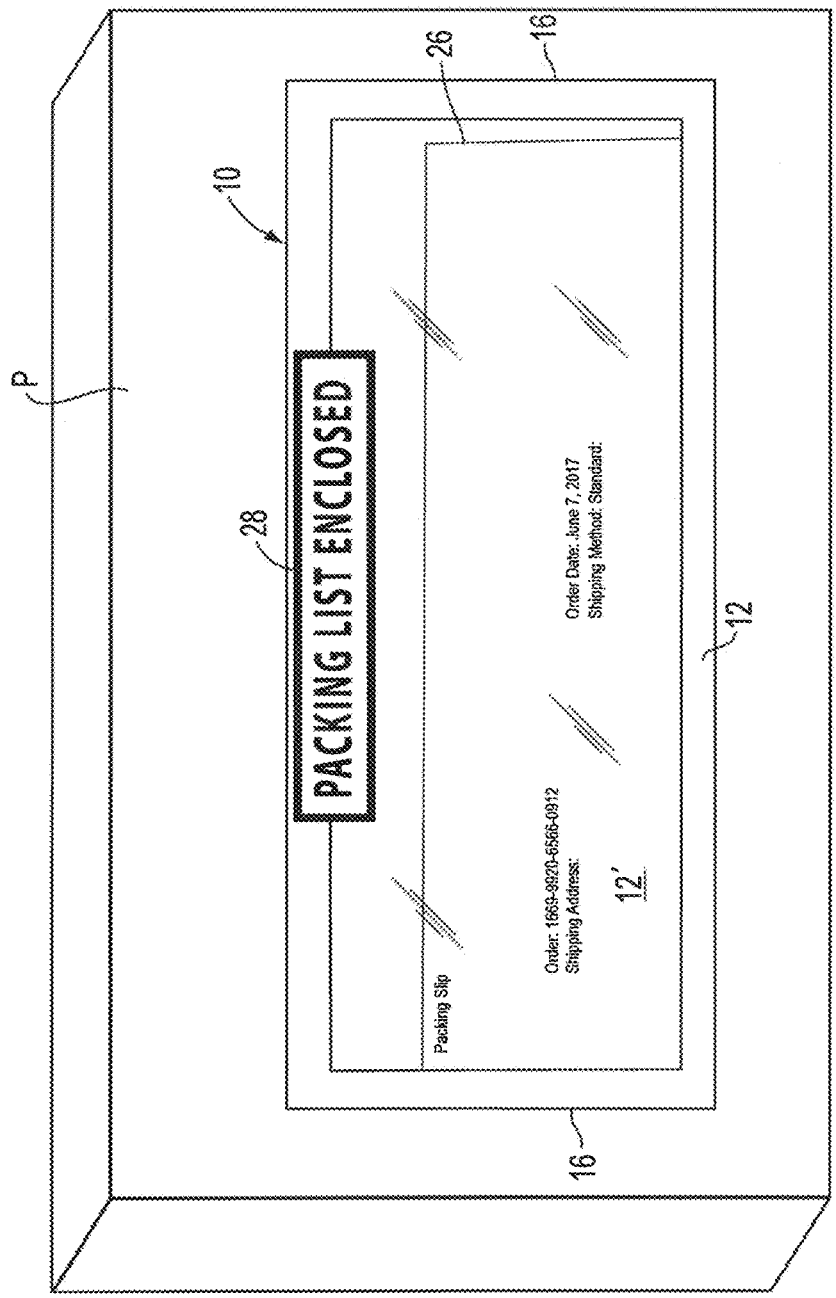
FIG. 3 is a perspective view showing the present shipping statement envelope after a shipping statement has been inserted and sealed therein, and the envelope adhered and affixed to an associated package for shipment.

After a shipping statement or like documentation, designated 26 (see FIG. 3) is placed in the interior of the envelope body, the release layer 24 can be removed to expose the pressure-sensitive adhesive layer 14'. The flap portion 22 can then be folded at fold line 22' and adhered to the adhesive layer 14' to close the access opening 20. Address information and the like provided on the shipping documentation 26 can be readily observed through the transparent portion 12' of the front panel 12 of the envelope body, which in the illustrated embodiment is provided as a so-called "full view" window. The remaining portion of the exposed adhesive layer 14' thereafter permits the shipping statement envelope 10 and its contents to be affixed to an associated package, designated P in FIG. 3, for shipment. Suitable indicia 28 can be provided on the exterior of the envelope 10 to alert the recipient of the package P that a shipping statement of like documentation is sealed within the envelope 10.

As noted, in the preferred form, the present shipping statement envelope 10 is dimensioned as a standard, No. 10, business-size envelope. By this configuration, and by virtue of the arrangement of the pressure-sensitive adhesive and release layers of the envelope, the envelope can be used with commercially available envelope stuffing machinery. To further facilitate such automated use, it is contemplated the documentation 26 inserted within the envelope comprise a tri-fold shipping statement, that is, one of more documents that have been horizontally folded into thirds, such as in the nature of typical business correspondence. Automated insertion machinery such as noted above can ordinarily per operated to automatically effect such tri-folding prior to insertion of each document into a respective one the envelopes 10.

The present invention further contemplates a method affixing a shipping statement, such as 26, to an associated package P. The present method comprises the steps of providing a shipping statement envelope 10 comprising a folded envelope body including a front panel 12 and a rear panel 14 joined to each other at opposite side edges 16, 16 and a bottom edge 18, wherein the envelope body defines an access opening 20 at an upper edge of the rear panel 14 for access to an interior of the envelope body. The front panel 12 includes a transparent portion 12', and further includes a flap portion 22 which extends beyond the upper edge of the rear panel 14, and which can be folded into at least partially overlapping relationship with the rear panel 1 for closing the access opening 20. The envelope 10 further includes a pressure-sensitive adhesive layer 14' on the rear panel 14, so that the flap portion 22 of the front panel 12 can be folded and adhered to the adhesive layer 14' to close the access opening 20. A release layer 24 applied to the pressure-sensitive adhesive layer 14' maintains the adhesive in a fresh condition.

The present method further includes inserting the shipping statement 26 into the interior of the envelope body, and removing the release layer 24 to expose the pressure-sensitive adhesive layer 14'. Next, the present method entails folding the flap portion 22 to close the access opening 20, and adhere the flap portion 22 to the adhesive layer 14'. The shipping statement documentation is thus enclosed and sealed within the envelope, with the transparent portion 12' of the front panel 12 of the envelope body permitting convenient and inspection and reading of the documentation.

Finally, the shipping statement envelope 10 and the shipping statement 26 can be adhered and secured to an associated package P by application of the exposed pressure-sensitive adhesive 14' to the exterior of the package, and the package can thereafter be shipped. In accordance with the preferred form of the present invention, the shipping statement envelope 10 is dimensioned for use in automated folding and stuffing machinery, thus facilitating convenient and efficient securement of shipping documentation to packages.

From the foregoing, it will be observed that numerous modifications and variations can be effected without departing from the true spirit and scope of the present invention. No limitation with respect to the specific embodiment illustrated herein in intended or should be inferred. The disclosure is intended to cover, by the appended claims, all such modifications as fall within the scope of the claims.

The invention claimed is:

1. A shipping statement envelope, comprising:
   a folded envelope body including a front panel and a rear panel joined to each other at opposite side edges and a bottom edge, and defining an access opening at an upper edge of said rear panel for access to an interior of said envelope body,
   said front panel including a transparent portion,
   said front panel including a flap portion which extends upwardly beyond said upper edge of said rear panel and which can be folded around a fold line into partially overlapping relationship with said rear panel for closing said access opening;
   a pressure-sensitive adhesive layer on said rear panel, said flap portion of said front panel being adhered to said adhesive layer when said flap portion is folded to close said access opening; and
   a release layer applied to said pressure-sensitive adhesive layer, so that after a shipping statement is placed in the interior of said envelope body, said release layer can be removed to expose said pressure-sensitive adhesive layer, and said flap portion folded and adhered to said adhesive layer to close said access opening while leaving exposed an area of the pressure-sensitive adhesive lever between the flap portion and the bottom edge of the folded envelope body, said exposed area of the pressure sensitive adhesive layer thereafter usable to engage an associated package to thereby maintain the shipping statement envelope on an associated package for shipment with the transparent portion exposed for viewing.

2. A shipping statement envelope in accordance with claim 1, in combination with a shipping statement wherein said shipping statement comprises a tri-fold shipping statement.

3. A shipping statement envelope in accordance with claim 1, wherein said envelope body is dimensioned as a standard business-size envelope.

4. The shipping statement envelope in accordance with claim 1 in combination with a shipping statement with writing thereon placed in the interior of said envelope body and the transparent portion of the front panel permits reading of the writing on the shipping statement placed in the interior of said envelope body.

5. A shipping statement envelope, comprising:
   a folded envelope body including a front panel and a rear panel joined to each other at opposite side edges and a bottom edge, and defining an access opening at an upper edge of said rear panel for access to an interior of said envelope body,
   said front panel including a flap portion which extends upwardly beyond said upper edge of said rear panel and which can be folded into partially overlapping relationship with said rear panel for closing said access opening;
   a pressure-sensitive adhesive layer on said rear panel, said flap portion of said front panel being adhered to said adhesive layer when said flap portion is folded at a fold line to close said access opening; and
   a release layer applied to said pressure-sensitive adhesive layer, so that after a shipping statement is placed in the interior of said envelope body, said release layer can be removed to expose said pressure-sensitive adhesive layer, and said flap portion folded and adhered to said adhesive layer to close said access opening while leaving exposed an area of the pressure-sensitive adhesive between the flap portion and the bottom edge of the folded envelope body, said exposed area of the pressure-sensitive adhesive layer thereafter usable to engage an associated package to thereby maintain the shipping statement envelope on an associated package for shipment with the front panel exposed for viewing.

6. The shipping statement envelope in accordance with claim 5 wherein the front panel includes a transparent portion through which a shipping statement placed in the interior of said envelope body can be viewed.

7. The shipping statement envelope in accordance with claim 5 wherein the pressure-sensitive adhesive extends substantially completely transversely of said rear panel portion between said side edges.

8. The shipping statement envelope in accordance with claim 7 wherein the pressure-sensitive adhesive extends vertically from said bottom edge to said access opening in spaced relationship to said fold line, wherein portions of the rear panel extend on respective opposite sides of said access opening and terminate at or below said fold line.

9. The shipping statement in accordance with claim 8 wherein the front panel includes a transparent portion through which a shipping statement placed in the interior of said envelope body can be viewed.

10. The shipping statement envelope in accordance with claim 5 wherein the pressure-sensitive adhesive extends vertically from said bottom edge to said access opening in spaced relationship to said fold line, wherein portions of the rear panel extend on respective opposite sides of said access opening and terminate at or below said fold line.

11. A method of affixing a shipping statement to a package, comprising the steps of:
   providing a shipping statement envelope comprising:
   a folded envelope body including a front panel and a rear panel joined to each other at opposite side edges and a bottom edge, and defining an access opening at an upper edge of said rear panel for access to an interior of said envelope body,
   wherein said front panel includes a transparent portion,
   said front panel including a flap portion which extends upwardly beyond said upper edge of said rear panel and which can be folded into partially overlapping relationship with said rear panel for closing said access opening, a pressure-sensitive adhesive layer on said rear panel, so that said flap portion of said front panel can be folded and adhered to said pressure-sensitive adhesive layer to close said access opening, and a release layer applied to said pressure-sensitive adhesive layer, the pressure-sensitive adhesive located on the rear panel so that with the flap folded and adhered to the pressure-sensitive adhesive layer an area of the pressure-sensitive adhesive layer remains exposed between the flip portion and the bottom edge of the folded envelope body;

inserting a shipping statement into the interior of said envelope body;

removing said release layer to expose said pressure-sensitive adhesive layer;

folding said flap portion to close said access opening and adhere said flap portion to said pressure-sensitive adhesive layer; and securing said shipping statement envelope and the shipping statement therein to an associated package for shipment by adhering the exposed area of the pressure-sensitive adhesive to the associated package.

12. A method of affixing a shipping statement in accordance with claim 11, wherein said shipping statement envelope is dimensioned for use in automated folding and stuffing machinery.

\* \* \* \* \*

UNITED STATES PATENT AND TRADEMARK OFFICE
CERTIFICATE OF CORRECTION

PATENT NO. : 10,479,558 B2  
APPLICATION NO. : 15/676000  
DATED : November 19, 2019  
INVENTOR(S) : C. Peter Redmon Page 1 of 1

It is certified that error appears in the above-identified patent and that said Letters Patent is hereby corrected as shown below:

In the Claims

Claim 1, (Column 7, Line 48), delete "lever" and substitute therefor "layer".

Claim 11, (Column 9, Line 11), delete "flip" and substitute therefor "flap".

Signed and Sealed this  
Seventeenth Day of March, 2020

Andrei Iancu  
*Director of the United States Patent and Trademark Office*